April 2, 1963    H. D. FULLER ETAL    3,084,342
TRACKING ANTENNA WITH GYROSCOPIC CONTROL
Filed Dec. 8, 1958    3 Sheets-Sheet 1

INVENTORS
HUBERT DAVID FULLER
ARTHUR DAVID SEWELL
BY
Kirschstein, Kirschstein & Ottinger
ATTORNEYS

INVENTORS
HUBERT DAVID FULLER
ARTHUR DAVID SEWELL

United States Patent Office 3,084,342
Patented Apr. 2, 1963

3,084,342
TRACKING ANTENNA WITH
GYROSCOPIC CONTROL
Hubert David Fuller, Watford, and Arthur David Sewell,
Hatch End, England, assignors to The General Electric Company Limited, London, England, a British company
Filed Dec. 8, 1958, Ser. No. 779,517
Claims priority, application Great Britain Dec. 18, 1957
27 Claims. (Cl. 343—761)

The present invention relates to position control arrangements, and particularly, though not exclusively, to aerial systems including such arrangements.

It is an object of the present invention to provide a position control arrangement of improved form.

A high frequency aerial system for use, for example, in a radar system, has been proposed in which a beam of electromagnetic waves is caused to be incident upon a passive reflector the angular position of which may be varied. The direction in which the beam is as a result transmitted into space after reflection from the reflector is dependent upon the actual angular position of the reflector relative to the direction of incidence of the beam thereon.

The reflector may be mounted for angular displacement about an axis which is itself arranged for angular displacement, with the reflector, about another axis, the two axes being mutually perpendicular. Thus, for a given direction of incidence of the beam of electromagnetic waves upon the reflector, the direction in which the beam is transmitted into space from the aerial system is dependent upon the angular displacements of the reflector about the two axes.

When such an aerial system is used, for example, in the radar system of an interceptor aircraft or, possibly, of a guided missile, to follow the track of a target aircraft, it is desirable to provide stabilisation of the aerial system such that the direction of the beam of electromagnetic waves transmitted from the aerial system is substantially independent of motions, in particular pitch and yaw, of the interceptor. Such stabilisation might be provided, in theory, from indications of the angular velocities of the beam about two mutually perpendicular reference axes which are also perpendicular to the direction in which the beam is transmitted from the aerial system.

The determination of the angular velocities of the beam about these two mutually perpendicular axes, might be performed in dependence upon the angular displacements of the reflector about each of its two mutually perpendicular axes within the interceptor, and also upon the angular velocities of the reflector and the interceptor in space; however, in these circumstances it is necessary to take into account the fact that for any angular displacement of the reflector the resulting angular displacement of the beam as transmitted is twice that of the reflector. It is for this reason that the angular velocity of the beam transmitted from the aerial system is not simply resolved into two components of angular velocity about the two axes of the reflector, angular velocity of the reflector about one of these axes resulting in a component of angular velocity of the beam about the other of those axes. There is therefore, so-called "cross-coupling" between the axes of the reflector as far as an indication of the angular velocity of the beam relative to those axes is concerned.

The actual determination of the angular velocities of the beam about the above-mentioned mutually perpendicular references axes, from the angular displacements of the reflector relative to the interceptor and the angular velocities in space of the reflector and the interceptor, presents serious practical difficulties. It has not been found possible as yet in practice to determine these angular velocities of the beam either with sufficient accuracy, or without requiring the use of a prohibitively large quantity of equipment.

It is another object of the present invention to provide a position control arrangement which may be used, for example, in the stabilisation of an aerial system such as that referred to above.

According to the present invention, in a position control arrangement in which a first member is mounted for angular displacement about one axis of two mutually perpendicular axes, said one axis being arranged for angular displacement, with said first member, about the other axis of said two axes, a second member is mounted on a system of $(n+1)$ axes (where $n$ is an integer greater than unity) each of which is individually perpendicular to, and, all except one, arranged for angular displacement about, another axis of said system of axes, said one of the $(n+1)$ axes being an axis of that system of axes about which said second member together with each of the other axes of said system is arranged to be angularly displaced, the arrangement being such that the angular displacement from a datum position of said second member about the axes of said system of axes is, in operation, $n$ times the angular displacement from a datum position of said first member about said two axes, at least for angular displacements of said first member within a predetermined range of such displacements.

The two axes about which said first member is adapted to be angular displaced may be separate from the system of $(n+1)$ axes, or, alternatively may be constituted by two axes of that system.

The position control arrangement according to the present invention may be used, for example, in the aerial system referred to above, to provide an indication of the direction in which a beam of electromagnetic waves is transmitted from (or received by) the aerial system, it being arranged in this case that the integer $n$ is 2, and that the reflector constitutes the first member. In these circumstances the position control arrangement will act to maintain the second member in a predetermined angular relationship to the beam, the angular velocity of the second member providing an indication of the angular velocity of the beam as required, for example, in the stabilisation of that aerial system.

According to a feature of the present invention, in a position control arrangement in which a first member is mounted for angular displacement about one axis of two mutually perpendicular axes, said one axis being arranged for angular displacement, with said first member, about the other axis of said two axes, a second member is mounted for angular displacement about a first axis of three axes, said first axis being perpendicular to, and arranged for angular displacement with said second member about, a second axis of said three axes, and said second axis being perpendicular to, and arranged for angular displacement with said first axis and said second member about, a third axis of said three axes, the arrangement being such that the angular displacement from a datum position, of said second member about said three axes is, in operation, twice the angular displacement from a datum position of said first member about said two axes, at least for angular displacements of said first member within a predetermined range of such displacements.

According to another feature of the present invention, a position control arrangement comprises a first member mounted for angular displacement about one axis of two mutually perpendicular axes, said one axis being arranged for angular displacement about the other axis of said two axes, a second member mounted for angular displacement about a first axis of three axes, said first axis being perpendicular to, and arranged for angular displacement with said second member about, a second axis of said three axes, and said second axis being perpendicular to, and arranged for angular displacement with said first axis and said second member about, a third axis of said three axes, and mechanical means adapted such that any angular displacement $\phi$ (where $\phi$ may be any angle, at least within a predetermined angular range) of said first member about said one axis is accompanied, in operation, by an angular displacement $2\phi$ of said first axis about said second axis, and such that any angular displacement $\theta$ (where $\theta$, which may be equal to $\phi$, may be any angle, at least within a predetermined angular range) of said one axis together with said first member about said other axis, is accompanied, in operation, by an angular displacement $\theta$ of said second member about said first axis and an angular displacement $\theta$ of said second axis about said third axis, the arrangement being such that angular displacement from a datum position of said second member about said three axes is, in operation, twice the angular displacement from a datum position of said first member about said two axes, at least for angular displacements within a predetermined range of such displacements.

According to a further feature of the present invention, in an aerial system including a plane reflector mounted for angular displacement about one axis of two mutually perpendicular axes, said one axis being arranged for angular displacement with said reflector, about the other axis of said two axes, and in which the angular displacement from a datum position of said reflector about said two axes determines the direction in which a beam of electromagnetic waves is transmitted from (or the direction from which such a beam is received by) said aerial system in operation, a member is mounted for angular displacement about a first axis of three axes, said first axis being perpendicular to, and arranged for angular displacement with said member about, a second axis of said three axes, and said second axis being perpendicular to, and arranged for angular displacement with said first axis and said member about, a third axis of said three axes, the angular displacements of said member about each of said three axes being controlled, in operation, to be dependent upon the angular displacement of said reflector about said one axis and the angular displacement of said one axis about said other axis such that said member is maintained in a predetermined angular relationship to the direction in which said beam of electromagnetic waves is transmitted from (or the direction from which such a beam is received by) said aerial system in operation, at least for angular displacements of said reflector within a predetermined range of such displacements.

An aerial system including a position control arrangement in accordance with the present invention will now be described, by way of example, with reference to the accompanying drawings in which.

Figure 1:
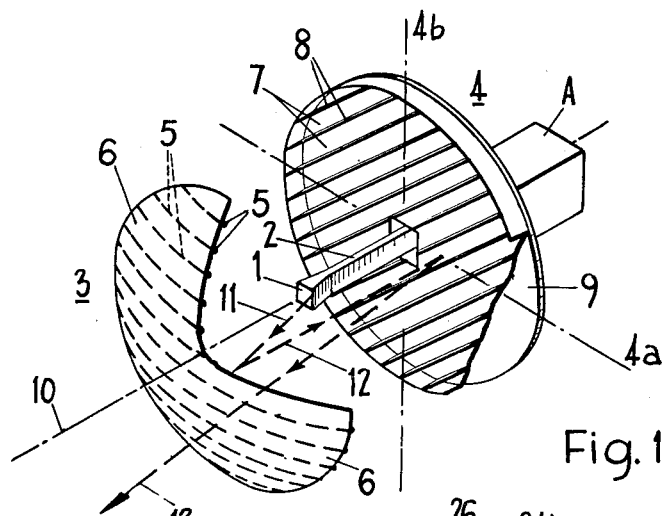
FIGURE 1 is a perspective view, partly in section, of the aerial system.

Referring to FIGURE 1, the aerial system comprises basically, a horn 1 for radiating electromagnetic waves, a waveguide 2 coupled to the horn 1 to pass electromagnetic waves from a source (not shown) to be radiated by the horn 1, a paraboloidal member 3 adapted to reflect electromagnetic waves directly incident thereon from the horn 1, a reflector 4, and an arrangement (represented schematically as a box A in FIGURE 1) coupled to the reflector 4 to control the angular position of the reflector 4 with respect to the horn 1 and to provide an indication of the angular velocity of the beam of electromagnetic waves produced by the system. The reflector 4 is mounted such that it may be angularly displaced relative to the horn 1 about two mutually perpendicular axes 4a and 4b.

The member 3 is constructed of a plurality of metal wires 5 which are embedded in dielectric material 6, such that the wires 5 lie in parallel spaced relationship with the distance between adjacent wires 5 slightly less than half the wavelength of the electromagentic waves incident thereon in operation, from the horn 1. The wires 5 are shaped and arranged to define a paraboloidal surface within the dielectric material. The member 3 is so mounted that the horn 1 is situated at the focus of this paraboloidal surface, and that the wires 5 are substantially parallel to the plane of the electric vector of electromagnetic waves radiated from the horn 1. The member 3 may be formed alternatively, of a glass fibre cloth having the wires 5 woven therein at appropriate intervals.

The reflector 4 is constructed of a plurality of metal rectangular channel-shaped members 7, having substantially parallel side-walls 8, mounted upon a metal plate 9. The distance between the walls 8 of each of the members 7 is slightly less than half the wavelength of the electromagnetic waves radiated from the horn 1 in operation.

The waveguide 2, which lies along an axis 10 of the system, passes through the centre of the reflector 4, the reflector 4 being mounted with the plane faces of the side-walls 8 at 45 degrees to the wires 5, that is, at 45 degrees to the plane of the electric vector of waves radiated from the horn 1 in operation. The width of the plane faces of each of the side walls 8, that is, the dimension thereof taken in a direction along the axis 10, is arranged to be an odd integral multiple of a quarter of the wavelength of the electromagnetic waves radiated in operation from the horn 1.

In operation, electromagnetic waves are radiated, as stated above, from the horn 1, one such wave being radiated from the horn 1, for example, along the path 11. Since the plane of the electric vector of the radiated waves is parallel to each of the wires 5, and the spacing between the wires 5 is less than half the wavelength of the radiated wave, the electromagnetic wave incident upon the member 3 from the horn 1 is reflected from the member 3. For example, the wave incident upon the member 3 along the path 11 is reflected from the member 3 along the path 12.

The waves reflected from the member 3 are incident upon the reflector 4. The plane of the electric vector of the electromagnetic waves incident upon the reflector 4 along, for example, the path 12, is at 45 degrees to each of the side-walls 8, and the spacing between the walls 8 is less than half the wavelength of these waves.

Now each of these waves incident upon the reflector 4 may be considered as being the resultant of two equal component waves having mutually perpendicular planes of polarisation, such that the electric vectors of these two components are, respectively, parallel to, and perpendicular to, the planes of the walls 8. That component which has an electric vector parallel to the planes of the walls 8, is reflected from the reflector 4 upon incidence. However the other component, having an electric vector perpendicular to the planes of the walls 8, is propagated along a path between adjacent walls 8 of one of the members 7, to be reflected back along the same path from the closed bottom of that member 7, and thereby re-propagated in space. There is, therefore, a path difference of an integral multiple of half the wavelength of the incident wave, between the two components as transmitted from the reflector 4.

The electromagnetic wave incident upon the reflector 4 along the path 12, is, in the above manner, transmitted from the reflector 4, for example, along the path 13, as a wave having two components. The planes of the electric vectors of these components are parallel to, and perpendicular to, respectively, the planes of the walls 8. However, as there is a path difference of an odd integral multiple of half the wavelength of the incident wave between these components, the plane of the electric vector of the resultant wave transmitted, for example, along the path 13, is perpendicular to that of the incident wave, and therefore perpendicular to the wires 5. The electromagnetic wave so transmitted from the reflector 4, is thus substantially unaffected by the presence of the member 3, since this wave as transmitted by the reflector 4, if incident upon the member 3, will pass between adjacent wires 5 through that member 3.

In this manner therefore, the electromagnetic waves radiated from the horn 1 are transmitted from the aerial system into space. The paraboloidal member 3 acts to collimate the waves as radiated from the horn 1 so that these waves are transmitted from the aerial system as a beam, the direction in space of this beam relative to the horn 1, being determined by the angular position of the reflector 4, about the axes 4a and 4b. The reflector 4 functions basically as a plane reflector.

It will be appreciated that the aerial system shown in FIGURE 1 may be used to receive a suitably polarised beam as well as to transmit such a beam in the manner described above. The aerial system may be used, for example, in a radar system, any portion of the transmitted beam reflected back to the aerial system and incident upon the reflector 4, being transmitted, after the plane of polarisation thereof has been rotated through 90 degrees by the reflector 4, to be reflected from the member 3 for reception by the horn 1.

It will be assumed in the following description that the aerial system forms part of the radar system of an interceptor aircraft, for locating and following, for example, a target aircraft. In such a case the arrangement represented as the box A in FIGURE 1, is required to function to provide an indication of the angular velocity of the beam transmitted from the aerial system for the stabilisation of that aerial system. The angular velocity of the beam itself is indicated in this arrangement by component angular velocities of a movable platform (not shown in FIGURE 1) which is controlled such that the normal to this platform is always parallel to the beam transmitted into space. In order to explain the manner in which this platform is so controlled to be in correspondence with the beam radiated from the aerial system, reference will now be made to FIGURE 2, in which the horn 1, the waveguide 2, and the reflector 3, have been omitted for clarity.

Figure 2:
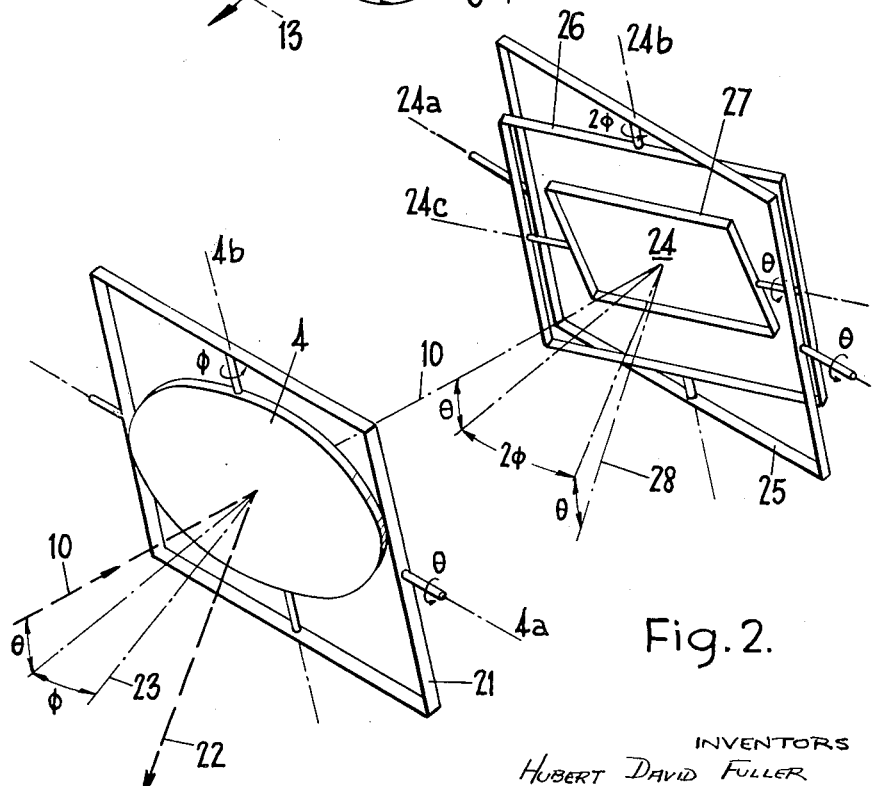
FIGURE 2 is a diagrammatic representation of a portion of the aerial system, to which reference is made by way of explanation.

Referring to FIGURE 2, the reflector 4 is represented in an angularly displaced position from a datum position in which the normal 23 to the reflector 4 is colinear with the axis 10. The reflector 4 is mounted for angular displacement about the outer and inner axes 4a and 4b, respectively, of a gimbal frame 21, and the angular position of the reflector 4 as represented is that which results from an angular displacement, from the datum position, of $\theta$ about the axis 4a, and $\phi$ about the axis 4b. In this position a beam of electromagnetic waves propagated along a path parallel to (but shown for clarity in FIGURE 2, as collinear with) the axis 10, is reflected along a path parallel to the indicated path 22. The angular displacement of the normal 23 from the axis 10, for such displacement of the reflector 4, is $\theta$ in the plane perpendicular to the axis 4a, and $\phi$ in the plane perpendicular to the axis 4b, as indicated.

A gyroscope platform 24 is defined by an inner gimbal frame 27, the platform 24 lying in the plane of the gimbal frame 27. The gimbal frame 27 is mounted within an outer gimbal frame 25 and an intermediate gimbal frame 26, for angular displacement about an outer axis 24a, an intermediate axis 24b, and an inner axis 24c, the axis 24a being parallel to the axis 4a.

It is arranged, by means not shown in FIGURE 2 for clarity, that the gimbal frame 25 is angularly displaced about the axis 24a, and that the gimbal frame 27 is angularly displaced about the axis 24c, by an angle equal to, and taken in the same sense as, any angular displacement of the gimbal frame 21 about the axis 4a. In addition it is arranged, also by means not shown in FIGURE 2 for clarity, that the gimbal frame 26 is angularly displaced about the axis 24b by an angle which is twice, and taken in the same sense as, any such displacement of the reflector 4 about the axis 4b. The datum position of the platform 24 from which these angular displacements about the axes 24a, 24b and 24c are taken, is that position in which the normal 28 to the platform 24 is colinear with the axis 10.

Thus for an angular displacement $\theta$ of the reflector 4 about the axis 4a, and $\phi$ about the axis 4b, as shown, the platform 24 is angularly displaced from the datum position thereof by $\theta$ about the axis 24a, by $2\phi$ about the axis 24b, and also by $\theta$ about the axis 24c. The angular displacement of the normal 28 to the platform 24 from the axis 10, for such displacement of the platform 24, is $\theta$ in the plane perpendicular to the axis 24a, $2\phi$ in the plane perpendicular to the axis 24b, and $\theta$ in the plane perpendicular to the axis 24c, as indicated. In this manner the angular displacement of the platform 24 is twice that of the reflector 4 for any angular displacement of the reflector 4. The normal 28 to the platform 24 is thereby maintained parallel to the path, for example, the path 22, of the beam of electromagnetic waves reflected from the reflector 21.

In the above manner therefore, the angular velocity in space of the normal 28 provides a direct indication of the angular velocity in space of the beam of electromagnetic waves transmitted into space from (or received from space by) the aerial system.

The actual construction of the arrangement, represented as the box A in FIGURE 1, which controls the angular position of the reflector 4 and maintains the normal 28 to the platform 24, as referred to above, parallel to the path of the beam transmitted into space by the aerial system, will now be described with reference to FIGURE 3. The member 3 has been omitted from FIGURE 3 for clarity.

Figure 3:
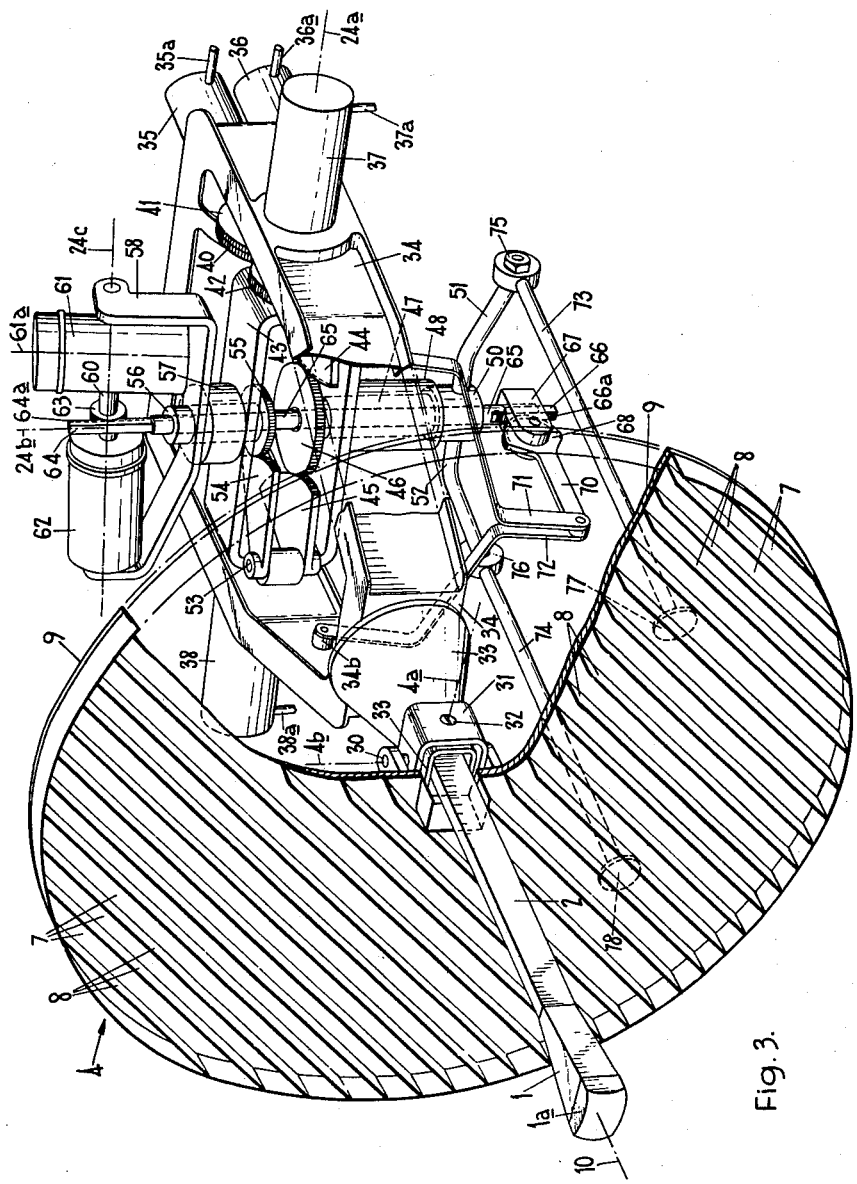
FIGURE 3 is a perspective view, partly broken away for clarity, of a portion of the aerial system.

Referring to FIGURE 3, the reflector 4 is mounted for rotation about the inner axis 4b by means of two trunnion members 30 (only one of which is shown) secured to the reflector plate 9 and journalled in a gimbal frame member 31 which corresponds to the gimbal frame 21 in FIGURE 2. The gimbal frame member 31 is itself mounted for rotation about the outer axis 4a by means of two trunnion members 32 (only one of which shown) journalled in a member 33. The member 33 is secured to a main framework 34 which is itself secured to the framework of the interceptor aircraft.

It will be appreciated that the form of the mounting of the reflector 4 upon the framework 34, as described above, is such that the reflector 4 may be angularly displaced about the axes 4a and 4b relative to the framework 34, the axis 4a being fixed relative to the framework 34 and the axis 4b being displaced angularly about the axis 4a with the reflector 4. Although the actual physical relationship between the axes 4a and 4b is such that the bearing arrangement of the axis 4a is within that of the axis 4b, it will be appreciated that the axis 4a is in fact the outer axis, and the axis 4b the inner axis, of the gimbal mounting of the reflector 4.

The waveguide 2 passes through the member 33 and is terminated by the horn 1, which in this figure is shown sealed by a dielectric plug 1a. The waveguide 2 normally lies along the axis 10 of the system, but may be arranged, by means not shown, for nutation about the axis 10.

Four single-acting hydraulic jacks 35, 36, 37, and 38 are mounted upon the main framework 34, pressure control of oil in the jacks 35, 36, 37, and 38 being effected through pipes 35a, 36a, 37a, and 38a, respectively. The jacks 35 and 36, as explained later, are coupled to sector gears 50 and 41, respectively, which each engage with a gear 42 dowelled to a frame 43, the frame 43 being mounted upon the framework 34 for rotation about the axis 24a. As in the case of FIGURE 2, the axis 24a is parallel to the axis 4.

The jacks 37 and 38, also as explained later, are coupled to quadrant gears 44 and 45, respectively, which each engage with a gear 46 secured to a shaft 47. The shaft 47 is mounted upon bearings (not shown) in a housing 48 attached to the frame 43, a boss 50, to which are attached arms 51 and 52, being secured to the shaft 47.

The quadrant gear 45 is mounted upon a shaft 53, a quadrant gear 54 also being mounted upon this shaft 53 such that for any rotation of the quadrant gear 45 there is a corresponding rotation of the quadrant gear 54.

The quadrant gear 54 engages with a gear 55 secured to a shaft 56. The shaft 56 is supported within bearings (not shown) in the frame 43 and in a boss 57, the boss 57 being attached to the frame 43. A bracket 58 is secured to the shaft 56, this bracket carrying a shaft 60 to which gyroscopes 61 and 62, are secured, the gyroscopes 61 and 62 being mounted upon bearings (not shown) in the bracket 58. The gyroscopes 61 and 62 are mounted upon the bracket 58 with the axis 61a of the gyroscope 61 perpendicular to, and that of the gyroscope 62 collinear with, the axis 24c of the shaft 60.

A gear 63 is also secured to the shaft 60, the gear 63 engaging with a rack gear 64a on a rod 64 which is free for axial and rotational movement within a tube 65 concentric with the shafts 47 and 56. The tube 65 is journalled within the shafts 47 and 56 and the boss 50, so that the shafts 47 and 56 and the boss 50 are free to rotate about the axis of the tube 65, this axis being collinear with the axis 24b. A further rod 66 having a rack gear 66a formed thereon, is free for axial, but not rotational, movement within the tube 65. It is arranged that any axial movement of the rod 64 is transmitted, along the axis 24b, directly to the rod 66 within the tube 65, but that the rods 64 and 66 are free to rotate relative to one another. In this manner any axial movement of the rack gear 66a is transmitted through the rack gear 64a to the gear 63, irrespective of any rotation of the bracket 58 about the axis 24b.

A member 67 is secured to the tube 65, and a sector gear 68 formed at one end of a link 70 engages with the rack gear 66a, the link 70 being pivoted to the member 67. The link 70 is pivoted to two links 71 and 72 which are themselves pivoted to projections 34a and 34b (of which only the projection 34b is shown) on the framework 34.

Rods 73 and 74 are connected to the arms 51 and 52, respectively, by gimbal type universal joints 75 and 76, respectively. The rods 73 annd 74 serve to transmit motion of the arms 51 and 52 under the control of the jacks 35, 36, 37, and 38, to the reflector 4, the rods 73 and 74 being coupled to the plate 9 by universal joints 77 and 78 (represented by dotted lines) similar to the universal joints 75 and 76.

In operation, the movement of the reflector 4 about each of the axes 4a and 4b is controlled by the oil pressure in each of the jacks 35, 36, 37, and 38, the reflector 4 being moved about the axis 4a by creating a difference in pressure between the oil in the jack 35 and that in the jack 36, and being moved about the axis 4b by similarly creating a difference in pressure between the oil in the jack 37 and that in the jack 38. The difference in pressure between the oil in the jack 35 and the oil in the jack 36, and between the oil in the jack 37 and the oil in the jack 38, is controlled by servo valves (not shown) which are each operated under the control of electric signals derived in the radar system.

Figure 4:
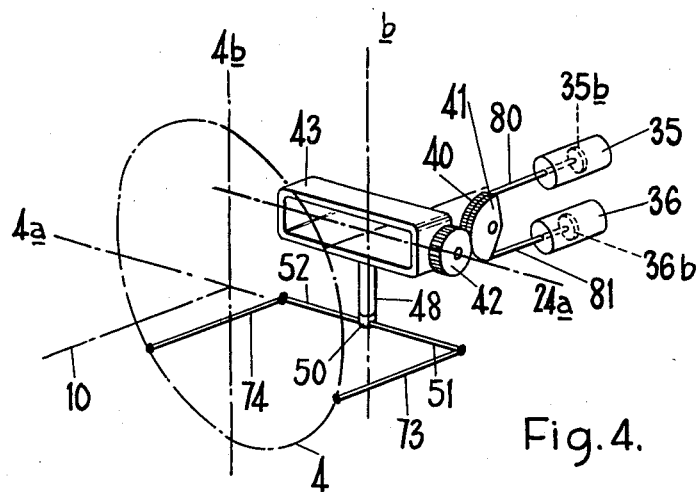
FIGURE 4 is a diagrammatic representation of a portion of the arrangement shown in FIGURE 3, to which reference is made by way of explanation.

The manner in which the jacks 35 and 36 are arranged to control angular displacement of the reflector 4 about the axis 4a will now be described with reference to FIGURE 4, those parts of FIGURE 3 which are also shown in FIGURE 4 being ascribed the same references as ascribed thereto in FIGURE 3.

Referring to FIGURE 4, the jack 35 is coupled to the sector gear 40 by a rod 80, not shown in FIGURE 3, the rod 80 being connected to the piston 35b (shown in dotted lines only in FIGURE 4) of the jack 35. Similarly, the jack 36 is coupled to the sector gear 41 by a rod 81, not shown in FIGURE 3, the rod 81 being connected to the piston 36b (shown in dotted lines only in FIGURE 4) of the jack 36.

It is arranged that in operation, the oil in the jacks 35 and 36 is maintained under pressure, the sector gears 40 and 41 tending as a result to rotate the gear 42 in opposite senses, thereby eliminating any free play or so-called backlash, between the gears 40 and 41 and the gear 42.

When a pressure difference between the oil in the jacks 35 and 36 is created, the thrust on one of the rods 80 and 81 will be greater than that on the other, and rotation of the gear 42 will result. For example if the oil pressure in the jack 35 is caused to exceed that in the jack 36, the thrust applied to the rod 80 will exceed that applied to the rod 81, and will thereby cause the torque applied to the gear 42 by the sector gear 40 to exceed that applied by the gear 41. The gear 42 (and the sector gear 41) therefore, will be rotated against the torque applied to the gear 42 by the sector gear 41, under the torque applied to the gear 42 by the sector gear 40. Similarly if the oil pressure in the jack 36 exceeds that in the jack 35, the gear 42 (and the sector gear 40) will be rotated against the torque applied to the gear 42 by the sector gear 40, under the torque applied to the gear 42 by the sector gear 41.

Rotation of the gear 42 under the action of the jacks 35 and 36 results in angular displacement of the frame 43 and the attached housing 48, about the axis 24a. This angular displacement is transmitted directly to the reflector 4 by the rods 73 and 74, such that the angular displacement of the reflector 4 about the axis 4a is equal to that of the frame 43 about the axis 24a.

In the above manner therefore, the angular displacement of the reflector 4 about the axis 4a is controlled by the jacks 35 and 36, such displacement of the reflector 4 resulting from the angular displacement of the frame 43 about the axis 24a, and being transmitted to the reflector 4 by the rods 73 and 74.

Figure 5:
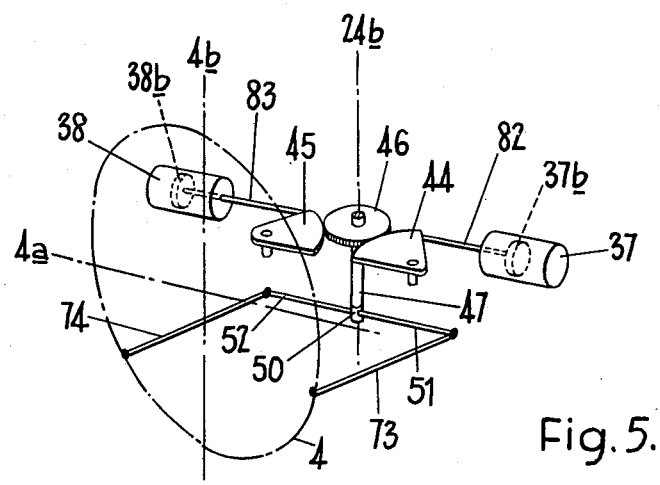
FIGURE 5 is a further diagrammatic representation of a portion of the arrangement shown in FIGURE 3, to which reference is also made by way of explanation.

In order to describe the manner in which the jacks 37 and 38 are arranged to control angular displacement of the reflector 4 about the axis 4b, reference will now be made to FIGURE 5, those parts of FIGURE 3 which are also shown in FIGURE 5 being ascribed the same references as ascribed thereto in FIGURE 3.

Referring to FIGURE 5, the jack 37 is coupled to the quadrant gear 44 by a rod 82, not shown in FIGURE 3, the rod 82 being connected to the piston 37b (shown in dotted lines only in FIGURE 5) of the jack 37. Similarly, the jack 38 is coupled to the quadrant gear 45 by a rod 83, not shown in FIGURE 3, the rod 83 being connected to the piston 38b (shown in dotted lines only in FIGURE 5) of the jack 38.

As in the case of the jacks 35 and 36, it is arranged that the oil in the jacks 37 and 38 is maintained under pressure, the quadrant gears 44 and 45 tending as a result to rotate the gear 46 in opposite senses, thereby eliminating free play between the quadrant gears 44 and 45 and the gear 46.

When a pressure difference between the oil in the jacks 37 and 38 is created, the thrust on one of the rods 82 and 83 will be greater than that on the other, and rotation of the gear 46 will result in a manner similar to that in which the jacks 35 and 36 cause rotation of the gear 42, as described above.

Rotation of the gear 46 under the action of jacks 37 and 38 is transmitted by the shaft 47 to the boss 50, and results in angular displacement of the arms 51 and 52 about the axis 24b. Such angular displacement of the arms 51 and 52 about the axis 24b is transmitted directly to the reflector 4 by the rods 73 and 74 such that the resulting angular displacement of the reflector 4 about the axis 4b is equal to that of the arms 51 and 52 about the axis 24b.

In the above manner therefore, the angular displacement of the reflector 4 about the axis 4b is controlled by the jacks 37 and 38, such displacement of the reflector 4 resulting from rotation of the gear 46 under the action of the quadrant gears 44 and 45, the rotation of the gear 46 being transmitted to the reflector 4 through the shaft 47 and the rods 73 and 74.

Referring once again to FIGURE 3, the rotation of the quadrant gear 45 under the action of the jack 38 is transmitted to the quadrant gear 54 by the shaft 53, and results in rotation of the shaft 56 through the gear 55. The gears 45, 46, 54, and 55, are so arranged that, for any rotation of the quadrant gear 45, the resulting rotation of the gear 55 is twice that of the gear 46. Thus, rotation of the gear 46, under the action of the jacks 37 and 38, which results in an angular displacement $\phi$ of the arms 51 and 52 about the axis 24b, is accompanied by an angular displacement $2\phi$, in the same sense, of the bracket 58 about the axis 24b. Hence, since this angular displacement of the arms 51 and 52 about the axis 24b is transmitted to the reflector 4, the bracket 58 is displaced by an angle $2\phi$ about the axis 24b for an angular displacement $\phi$ of the reflector 4 about the axis 4b.

As will be appreciated from the above description of the manner in which the reflector 4 is angularly displaced about the axis 4a, an angular displacement $\theta$ of the reflector 4 about the axis 4a is accompanied by an angular displacement $\theta$, in the same sense, of the bracket 58 about the axis 24a; the bracket 58 is directly connected to the frame 43 by the shaft 56 such that the bracket 58 moves with the frame 43 for angular displacement of the frame 43 about the axis 24a. In addition, the angular displacement of the frame 43 about the axis 24a results in rotation of the sector gear 68 relative to the member 67. This rotation of the sector gear 68 relative to the member 67 results from the displacement of the frame 43 about the axis 24a, and is due to the movement of the parallelogram linkage formed by that part of the main framework 34 between the axis 24a and the projections 34a and 34b, the links 71 and 72, the link 70, and the member 67 together with the tube 65. Thus, displacement of the frame 43 about the axis 24a is transmitted to the rack gear 66a through the sector gear 68, to cause the rack gear 64a to rotate the gear 63.

Such rotation of the gear 63 causes the gyroscopes 61 and 62 to be angularly displaced about the axis 24c. It is arranged that such angular displacement of the gyroscopes 61 and 62 about the axis 24c is equal to the angular displacement of the frame 43 about the axis 24a, and is therefore the same in sense and amplitude as the angular displacement of the reflector 4 about the axis 4a.

From the above description it will be understood that an angular displacement $\theta$ of the reflector 4 about the axis 4a, and $\phi$ about the axis 4b, will be accompanied by angular displacements of the gyroscopes 61 and 62 about the axes 24a, 24b, and 24c. These angular displacements of the gyroscopes 61 and 62 will be, in fact, $\theta$ about the axis 24a, $2\phi$ about the axis 24b and $\theta$ about the axis 24c, the gyroscopes 61 and 62 being mounted, in effect, within three gimbal frames corresponding to the gimbal frames 25, 26, and 27 shown in FIGURE 2.

From the expanation given above with reference to FIGURE 2, it will be appreciated that the gyroscopes 61 and 62, in effect, lie on an imaginary platform, corresponding to the gyroscope platform 24 defined in FIGURE 2, which is angularly displaced about the axes 24a, 24b, and 24c, in accordance with the displacements of the beam of electromagnetic waves transmitted into space from (or received from space by) the reflector 4. The axis 61a of the gyroscope 61, and that (24c) of the gyroscope 62, lie in a plane, corresponding to that of the gyroscope platform 24 defined in FIGURE 2, the normal to which (corresponding to the normal 28 of FIGURE 2) is parallel to the beam of electromagnetic waves so transmitted (or received) by the reflector 4.

Although the gyroscopes 61 and 62 have been shown in FIGURE 3 to be mounted with their axes respectively intersecting, and coincident with, the axis 24c, it may be found desirable in actual fact to mount the gyroscopes 61 and 62 so that each of these axes is parallel to, but laterally displaced from the position of that axis as represented in FIGURE 3.

The gyroscope 61 is a so-called "rate gyroscope," arranged to provide an output electric signal dependent in amplitude upon the angular velocity of that gyroscope about the axis 24c. The gyroscope 62 similarly is arranged to provide an output signal dependent in amplitude upon the angular velocity of that gyroscope about the axis 61a. Thus, the output signals from the gyroscopes 61 and 62, which are passed to other apparatus (not shown) in the radar system, are dependent in amplitude upon the angular velocity of the beam of electromagnetic waves transmitted from (or received by) the aerial system. The signal from the gyroscope 61 is dependent upon the component of this angular velocity about the axis 24c, and that from the gyroscope 62 is dependent upon the component about the axis 61a. The angular velocity of the beam is therefore indicated, by these two output signals, relative to two references axes, the axes 61a and 24c, which whilst being mutually perpendicular are also maintained perpendicular to the direction in which the beam is transmitted (or from which the beam is received).

In order to stabilise the aerial system such that the direction in which a beam of electromagnetic waves is transmitted from that aerial system is substantially independent of motions of the interceptor aircraft, the output signals from the gyroscopes 61 and 62 are passed to electronic equipment in the radar system, which effects control of the servo valves (referred to above, but not shown) which in turn control the flow of oil to the jacks 35, 36, 37, and 38. This control is such that compensation is made in the angular position of the reflector 4, for any angular motion in space of the interceptor aircraft. The required compensating movement of the reflector 4 about the axes 4a and 4b is indicated directly by the output signals from the gyroscopes 61 and 62, and does not involve any complicated computation such as would be required if this compensating movement had to be derived from the angular displacement of the reflector 4 about the axes 4a and 4b and the angular velocities of the reflector and aircraft in space. The degree of accuracy of stabilisation obtainable is therefore much greater than otherwise might be the case, and the quantity of electronic equipment required to effect the control of the servo valves is relatively small.

The axes 24c and 61a in addition to being mutually perpendicular and perpendicular to the direction in which the beam is transmited, are related to the axes 4a and 4b respectively, in a particularly convenient manner. This relationship is such that during any nutation of the horn 1, the resultant small angular displacements about the axes 24c and 61a of the beam transmitted from the aerial system, are the same as the angular displacements of the horn 1 about the axes 4a and 4b, respectively. This leads to further simplification in the control equipment required in the radar system for tracking the target aircraft.

In addition to being used for the stabilisation of the aerial system, the output signals from the gyroscopes 61 and 62 may be used in the computation of the velocity of the target aircraft. Further, the actual direction, relative to the interceptor aircraft, in which the beam is transmitted (and hence the position of the target aircraft) may be computed from the angular displacement of the reflector 4 about the axes 4a and 4b. Indication of these angular displacements may be provided, for example, by synchros (not shown) coupled to the gears 42 and 46.

It will be appreciated that the present invention has been described above in relation to a position control arrangement in an aerial system in which it is desired to control the postion of the shaft 60 upon which the gyroscopes 61 and 62 are mounted, such that the angular displacement from a datum position, of the shaft 60, and therefore of the gyroscopes 61 and 62, about the axes 24a, 24b, and 24c, is twice the angular displacement from a datum position, of the reflector 4 about the axes 4a and 4b. The datum position of the shaft 60 is that in which the normal to the gyroscope platform (corresponding to the normal 28 to the gyroscope platform 24 of FIGURE 2) is parallel to the axis 10, and the datum position of the reflector 4 is that in which the normal (corresponding to the normal 22 of FIGURE 2) to the reflector 4 is parallel to the axis 10 also. However, the present invention is not limited to such position control arangement in which the angular displacement of one member (in the above example, the shaft 60) about three axes (the axes 24a, 24b, and 24c) is controlled to be twice the angular displacement of a further member (the reflector 4) about two axes (the axes 4a and 4b). This invention may be applied generally to provide position control arrangements in which the angular displacement of this first-mentioned member is any larger integral multiple of such angular displacement of the further member.

For example, in FIGURE 2, let it be assumed that it is desired that the normal 28 to the platform 24 should be maintained parallel to a given vector the angular displacement of which from the axis 10, is always three times the angular displacement of the normal 23 to the reflector 4 from the axis 10. In this case the platform 24 would be defined by a gimbal frame (not shown) of a further axis, the axis 24d say (not shown). This axis 24d would be positioned within the gimbal frame 27 perpendicular to the axis 24c, such that the platform 24 is then free for angular displacement about the four axes 24a, 24b, 24c, and 24d, instead of, as shown in FIGURE 2, about the three axes 24a, 24b, and 24c only. The platform 24 in this manner would be free for angular displacement relative to the axis 24c, and it would be arranged that, for angular displacements $\theta$ and $\phi$ of the reflector 4 about the axes 4a and 4b respectively, the angular displacements of the platform 24 are $\theta$ about the axis 24a, $2\phi$ about the axis 24b, $2\theta$ about the axis 24c, and $\phi$ about the axis 24d.

Similarly, if it is desired that the normal 28 to the platform 24 should be maintained parallel to a vector the angular displacement of which from the axis 10, is always four times the angular displacement of the normal 23 from the axis 10, then the platform 24 would be defined within a further gimbal frame (not shown) of a still further axis, the axis 24e say (not shown), positioned within the gimbal frame of the axis 24d referred to above. This axis 24e would be perpendicular to the axis 24d, and in this case it would be arranged that the angular displacements of the platform 24, for displacements $\theta$ and $\phi$ of the reflector 4 about the axes 4a and 4b, respectively, are $\theta$ about the axis 24a, $2\phi$ about the axis 24b, $2\theta$ about the axes 24c, $2\phi$ about the axis 24d, and $\theta$ about the axis 24e.

In general, consider the case in which a first member is arranged for angular displacement about two mutually perpendicular axes, the axes P0 and P1 say, such that the first member may be angularly displaced about the axis P1 which itself may be angularly displaced, with the first member, about the axis P0. The position of a second member in these circumstances may be maintained such that the angular displacements of the second member from some datum position thereof, is $n$ times (where $n$ is an integer greater than unity) the angular displacement from some datum position, of the first member, by mounting the second member upon a system of $(n+1)$ axes, the axes Q0, Q1 ... Qn, say, and arranging that the angular displacements of the second member about these axes are dependent in a given manner upon the angular displacements of the first member about the axes P0 and P1. In this case the axes Q0, Q1 ... Qn are arranged such that the second member is mounted for angular displacement about the axis Qn; the axis Qn is perpendicular to, and is arranged for angular displacement, with the second member, about the axis Q(n−1); the axis Q(n−1) is perpendicular to, and is arranged for angular displacement with the axis Q(n) and the second member, about the axis Q(n−2); the axis Q(n−2) is perpendicular to, and is arranged for angular displacement with the axes Q(n−1) and Q(n) and the second member, about the axis Q(n−3) ... and the axis Q1 is perpendicular to, and is arranged for angular displacement with the axes Q2, Q3 ... Q(n−1) and Qn and the second member, about the axis Q0.

The angular displacements of the second member about the axes Q0, Q1 ... Q(n), are controlled, as stated above, in dependence upon the angular displacements of the first member about the axes P0 and P1, it being arranged that if the angular displacement of the first member about the axis P0 is $\theta$, and about the axis P1 is $\phi$, the angular displacement of the axis Q1 about the axis Q0 is $\theta$; the angular displacement of the axis Q2 about the axis Q1 is $2\phi$; the angular displacement of the axis Q3 about the axis Q2 is $2\theta$; the angular displacement of the axis Q4 about the axis Q3 is $2\phi$; the angular displacement of the axis Q5 about the axis Q4 is $2\theta$ ...; the angular displacement of the axis Qn about the axis Q(n−1) is, if $n$ is even, $2\phi$, or, if $n$ is odd, $2\theta$; and the angular displacement of the second member about the axis Qn is, if $n$ is even, $\theta$, or, if $n$ is odd, $\phi$.

From above it will be appreciated that the respective angular displacements of the axes Q2 to Qn about the axes Q1 to Q(n−1) may be expressed generally in terms of the angular displacement of the axis Qr (where $r$ is any integer greater than unity and which is equal to or less than $n$) about the axis Q(r−1), $r$ having a value appropriate to the particular axis Q2 to Qn under consideration. With this general expression, the angular displacement of this axis Qr about the axis Q(r−1) is $2\phi$ if $r$ is even, but $2\theta$ if $r$ is odd.

We claim:
1. A position control arrangement comprising: a first member; means mounting said first member for angular displacement about one axis of two mutually perpendicular axes, said one axis being arranged for angular displacement with said first member about the other axis of said two axes; a second member; means mounting said second member on a system of $(n+1)$ axes where $n$ is an interger greater than unity, said $(n+1)$ axes being perpendicular to, and, all except one, arranged for angular displacement about respective ones of said system of axes, and said one of the $(n+1)$ axes being an axis of that system of axes about which said second member together with each of the other $n$ axes of said system is arranged to be angularly displaced; means responsive to angular displacement of said first member about said two axes to displace angularly said $n$ axes about their respective axes of said $(n+1)$ axes, the latter means including means to displace angularly an axis of said $n$ axes about its respective axis by double the displacement angle of said first member about the said one axis of said two axes; and further means responsive to angular displacement of said first member about one of said two axes to displace angularly said second member relative to said system of $(n+1)$ axes, so that the angular displacement from a datum position of said second member about said system of axes is $n$ times the angular displacement from a datum position of said first member about said two axes.

2. A position control arrangement according to claim 1 wherein the $(n+1)$ axes $Q0$, $Q1 \ldots Qn$, say, are arranged with the second member mounted for angular displacement about the axis $Qn$, with the axis $Q1$ perpendicular to and arranged for angular displacement about the axis $Q0$, and with each axis $Qr$ (where $r$ has any integral value greater than unity which is equal to or less than $n$) of the $(n+1)$ axes perpendicular to and arranged for angular displacement about the axis $Q(r-1)$, and wherein means is arranged such that for any angular displacement $\phi$ of said first member about said one axis and any angular displacement $\theta$ of said one axis about said other axis (where $\theta$ and $\phi$, which may be equal, may be any angles at least within predetermined angular ranges), the axis $Q1$ is angularly displaced about the axis $Q0$ by an angle $\theta$, the second member is angularly displaced about the axis $Qn$ by an angle $\theta$ if $n$ is even, but by an angle $\phi$ if $n$ is odd, and each axis $Qr$ is angularly displaced about the axis $Q(r-1)$ by an angle $2\phi$ if $r$ is even, but by an angle $2\theta$ if $r$ is odd.

3. A position control arrangement comprising a first member, means to mount said first member for angular displacement about one axis of two mutually perpendicular axes, said one axis being arranged for angular displacement with said first member about the other axis of said two axes, a second member, means to mount said second member for angular displacement about a first axis of three axes, said first axis being perpendicular to, and arranged for angular displacement with said second member about, a second axis of said three axes, and said second axis being perpendicular to, and arranged for angular displacement with said first axis and said second member about, a third axis of said three axes, means responsive to angular displacement of said first member about said one axis of said two axes to angularly displace said first axis about said second axis by double the displacement angle of said first member about said one axis, and means responsive to angular displacement of said first member about said other axis of said two axes to angularly displace said second member and said second axis about said first axis and said third axis respectively by angles which are both equal to the displacement angle of said first member about said other axis, whereby the angular displacement from a datum position of said second member about said three axes is double the angular displacement from a datum position of said first member about said two axes.

4. A position control arrangement according to claim 3 wherein for any angular displacement $\phi$ (where $\phi$ may be any angle, at least within a predetermined angular range) of said first member about said one axis there is, in operation, an angular displacement $2\phi$ of said first axis about said second axis, and wherein for any angular displacement $\theta$ (where $\theta$, which may be equal to $\phi$, may be any angle, at least within a predetermined angular range) of said one axis about said other axis there is, in operation, an angular displacement $\theta$ of said second member about said first axis and an angular displacement $\theta$ of said second axis about said third axis, these angular displacements $\theta$ of said second member and said second axis being in the same sense.

5. A position control arrangement according to claim 4 wherein a first frame is mounted for angular displacement about said third axis, a shaft is mounted upon said first frame coaxial with said second axis for angular displacement relative to said first frame about said second axis, and a second frame is carried by said shaft, said second member being mounted upon said second frame for angular displacement relative to that frame about said first axis, and wherein any angular displacement of said first frame about said third axis is transmitted to said second member along said second axis.

6. A position control arrangement according to claim 5 wherein said shaft is hollow and a rod lies along said second axis within that shaft, angular displacement of said first frame about said third axis being transmitted to said second member as a linear displacement of said rod along said second axis.

7. A position control arrangement according to claim 6 wherein said second member is carried by a shaft which is coaxial with said first axis, this shaft being geared to a rack gear arranged for linear displacement along said second axis with said rod.

8. A position control arrangement according to claim 6 wherein a parallelogram linkage is arranged to transmit angular displacement of said first frame about said third axis to said rod as a linear displacement of that rod along said second axis.

9. A position control arrangement according to claim 8 wherein one side of the parallelogram linkage lies along said second axis.

10. A position control arrangement according to claim 8 wherein said parallelogram linkage is coupled to the rod through a rack gear carried by the rod.

11. A position control arrangement comprising a first member mounted for angular displacement about one axis of two mutually perpendicular axes, said one axis being arranged for angular displacement about the other axis of said two axes, a second member mounted for angular displacement about a first axis of three axes, said first axis being perpendicular to, and arranged for angular displacement with said second member about, a second axis of said three axes, and said second axis being perpendicular to, and arranged for angular displacement with said first axis and said second member about, a third axis of said three axes, and mechanical means adapted such that any angular displacement $\phi$ (where $\phi$ may be any angle, at least within a predetermined angular range) of said first member about said one axis is accompanied, in operation, by an angular displacement $2\phi$ of said first axis about said second axis, and such that any angular displacement $\theta$ (where $\theta$, which may be equal to $\phi$, may be any angle, at least within a predetermined angular range) of said one axis together with said first member about said other axis, is accompanied, in operation, by an angular displacement $\theta$ of said second member about said first axis and an angular displacement $\theta$ of said second axis about said third axis, the arrangement being such that angular displacement from a datum position of said second member about said three axes is, in operation, twice the angular displacement from a datum position of said first member about said two axes, at least for angular displacements within a predetermined range of such displacements.

12. A position control arrangement according to claim 11 wherein said mechanical means insludes a frame mounted for angular displacement about said third axis, and a shaft mounted upon said frame coaxial with said second axis for angular displacement relative to said frame about said second axis, said mechanical means being such that any angular displacement $\phi$ of said shaft about said second axis causes said first member to be angularly displaced by an angle $\phi$ about said one axis, and such that any angular displacement $\theta$ of said frame about said third axis causes said one axis to be angularly displaced by an angle $\theta$ about said other axis.

13. A position control arrangement according to claim 12 wherein a further shaft is mounted upon said frame coaxial with said second axis for angular displacement relative to said frame about said second axis, this further shaft being coupled to the first-mentioned shaft so that for any angular displacement $\phi$ of this latter shaft about said second axis, there is an angular displacement $2\phi$ of said further shaft about that axis.

14. A position control arrangement according to claim 13 wherein said further shaft carries a further frame, said second member being mounted upon this frame for angular displacement relative to that further frame about said first axis, said further shaft is hollow, and a rod lies along said second axis within said further shaft, angular displacement of said first-mentioned frame about said third axis being transmitted to said second member as a linear displacement of said rod along said second axis relative to said further shaft.

15. A position control arrangement according to claim 14 wherein said rod is arranged to be angularly displaced with said further shaft about said second axis, said first-mentioned shaft is hollow, and a further rod lies along said second axis within said first-mentioned shaft, this further rod being arranged to be angularly displaced with said first-mentioned shaft about said second axis and to be linearly displaced along said second axis relative to that shaft for angular displacement of said first-mentioned frame about said third axis, and wherein the first-mentioned rod and said further rod are so coupled together that any linear displacement of said further rod along said second axis relative to said first-mentioned shaft is transmitted directly to said first-mentioned rod, these rods being free for relative angular displacement about said second axis.

16. A position control arrangement according to claim 15 wherein a parallelogram linkage is arranged to transmit angular displacement of said first-mentioned frame about said third axis to said further rod as a linear displacement of that rod along said second axis.

17. A position control arrangement according to claim 16 wherein said third axis is parallel to said other axis.

18. An aerial system comprising a primary aerial for radiating a beam of electromagnetic waves, a plane reflector for reflecting the beam of electromagnetic waves radiated by the primary aerial, means to mount said reflector for angular displacement about one axis of two mutually perpendicular axes, said one axis being arranged for angular displacement with said reflector, about the other axis of said two axes, a member, means to mount said member for angular displacement about a first axis of a system of three axes, said first axis being perpendicular to, and arranged for angular displacement with said member about, a second axis of said three axes, and said second axis being perpendicular to, and arranged for angular displacement with said first axis and said member about, a third axis of said three axes, means responsive to angular displacement of said reflector about said one axis of said two axes to angularly displace said first axis about said second axis by double the displacement angle of said first member about said one axis, and means responsive to angular displacement of said reflector about said other axis of said two axes to angularly displace said member and said second axis about said first axis and said third axis respectively by angles which are both equal to the displacement angle of said first member about said other axis, whereby said member is maintained in a predetermined angular relationship to the direction in which said beam of electromagnetic waves is reflected from the reflector.

19. An aerial system according to claim 18 wherein for any angular displacement $\phi$ (where $\phi$ may be any angle, at least within a predetermined angular range) of said reflector about said one axis there is, in operation, an angular displacement $2\phi$ of said first axis about said second axis, and wherein for any angular displacement $\theta$ (where $\theta$, which may be equal to $\phi$, may be any angle, at least within a predetermined angular range) of said one axis about said other axis there is, in operation, an angular displacement $\theta$ of said second member about said first axis and an angular displacement $\theta$ of said second axis about said third axis.

20. An aerial system according to claim 19 including a first frame mounted for angular displacement about said third axis, first and second shafts mounted upon said first frame coaxial with said second axis for angular displacement relative to said first frame about said second axis, mechanical means interconnecting said first shaft and said reflector such that for any angular displacement $\phi$ of that shaft about said second axis and any angular displacement $\theta$ of said first frame about said third axis, that means causes said reflector to be angularly displaced by an angle $\phi$ about said one axis and said one axis to be angularly displaced by an angle $\theta$ about said other axis, a second frame carried by said second shaft, said second member being mounted upon this frame for angular displacement relative to that frame about said first axis, and means to angularly displace said second shaft about said second axis by an angle $2\phi$ for any angular displacement $\phi$ of said first shaft about that axis.

21. An aerial system according to claim 18 wherein said second member is a device for providing an indication dependent upon the angular velocity in space of a datum direction defined in that device.

22. An aerial system according to claim 21 wherein said datum direction is perpendicular to said first axis, and said device is adapted to provide an indication of the component of angular velocity in space of said datum direction about said first axis.

23. An aerial system according to claim 21 wherein said datum direction is perpendicular to said first axis, and said device is adapted to provide an indication of the component of angular velocity of said datum direction in space about an axis perpendicular to said first axis and said datum direction.

24. An aerial system according to claim 21 wherein said device is a gyroscope.

25. An aerial system according to claim 22 including a further device mounted for angular displacement with the first-mentioned device about said first axis, this further device being adapted to provide an indication of the angular velocity in space of said datum direction about an axis perpendicular to said first axis and said datum direction.

26. An aerial system according to claim 25 wherein said first-mentioned device and said further device are both gyroscopes.

27. An aerial system according to claim 25 wherein the datum direction is parallel to the direction in which said beam of electromagnetic waves is transmitted from (or the direction from which such a beam is received by) said aerial system in operation.

References Cited in the file of this patent

UNITED STATES PATENTS

| 2,700,106 | Taylor | Jan. 18, 1955 |
| 2,836,894 | Wagner | June 3, 1958 |
| 2,867,801 | Mariner et al. | Jan. 6, 1959 |